United States Patent Office 2,912,330
Patented Nov. 10, 1959

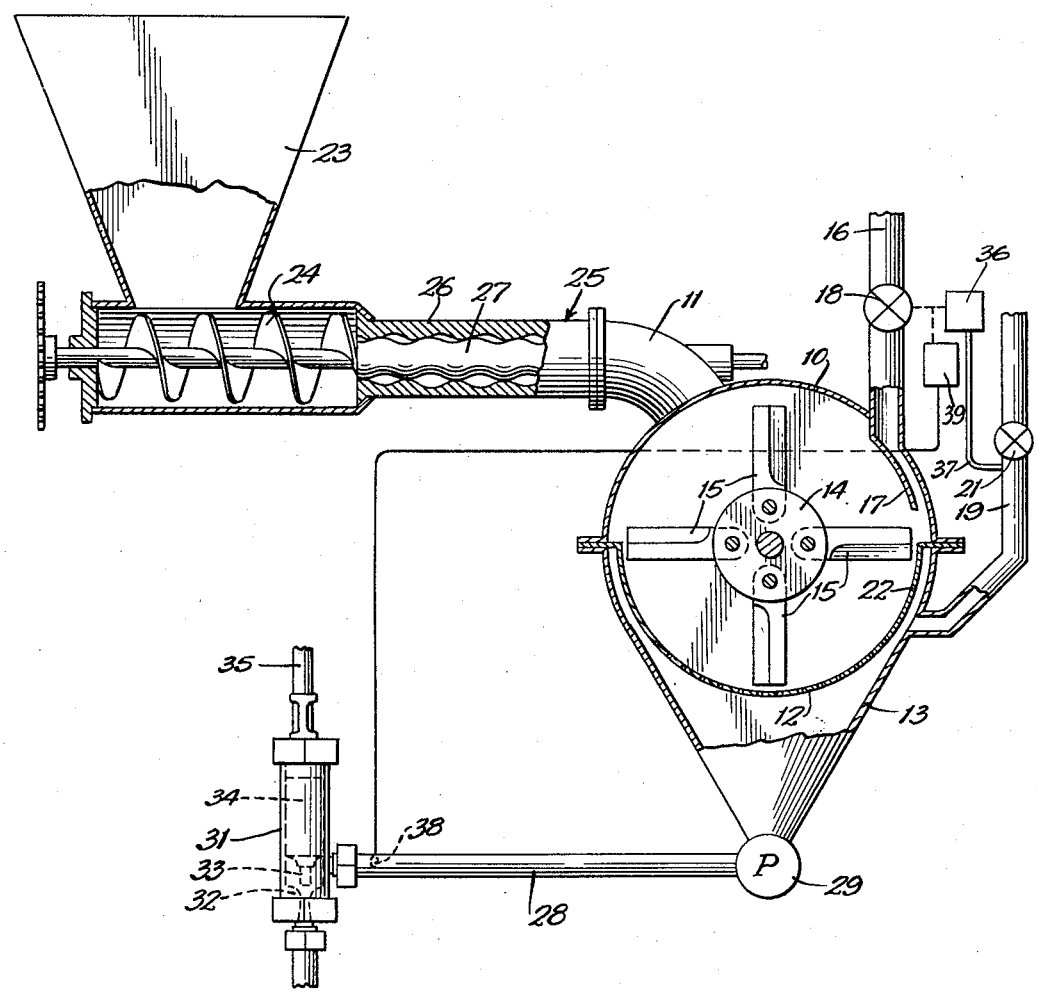

2,912,330

METHOD OF TREATING FRUITS, VEGETABLES AND MEATS

Le Roy R. Hawk, Hayward, Calif., and Elmer G. Magnus and Dewey A. Manion, Chicago, Ill., assignors to W. J. Fitzpatrick Company, Chicago, Ill., a corporation of Illinois Application April 30, 1956, Serial No. 581,565

5 Claims. (Cl. 99—1)

This invention relates to a method of treating food products and the like and more particularly to a method of simultaneously comminuting or reducing and heating the products.

In processing various types of materials for industrial purposes, for oil extraction, or for preparation of food purees, soups and the like, the materials are comminuted to a predetermined particle size and are heated to effect chemical changes therein, to extract oils therefrom or to cook the materials. It has been the conventional practice heretofore to carry out the comminuting and heating steps successively and while this is satisfactory for some processes there are many conditions in which the material is adversely affected by exposure after being comminuted and before being heated. In all cases the equipment required for carrying out these steps successfully is relatively large and expensive.

It is one of the objects of the present invention to provide a method in which the products or materials are simultaneously comminuted and heated thereby to avoid any possible deleterious effects due to exposure of the comminuted product and greatly simplifying the equipment required to carry out the process.

Another object is to provide a method in which the products or materials are comminuted while enveloped in an atmosphere of steam under pressure.

According to one feature of the invention the product is suspended in an atmosphere of steam under pressure and is comminuted by being cut or impacted by moving blades while so suspended.

A further object is to provide a method in which the product, after being comminuted, is maintained under pressure and at an elevated temperature for a predetermined time and then suddenly has the pressure thereon relieved.

A still further object is to provide a method in which the chamber in which the product is comminuted is continuously vented to remove gas therefrom and to maintain a continuous supply of steam under pressure thereto.

According to a feature of the invention the supply of steam is controlled in response to the pressure in the vent and may be additionally controlled in response to the temperature of the finished product.

The above and other objects and features of the invention will be more readily apparent from the following description when read in connection with the accompanying drawing in which the single figure is a diagrammatic view with parts shown in section of an apparatus for carrying out the method.

The apparatus employed as shown in the drawing and as more particularly described and claimed in our copending application, Serial No. 581,682, filed April 30, 1956, and now Patent No. 2,873,663, includes a partially cylindrical comminutor chamber 10 formed with an inlet conduit 11 opening into its upper portion for supplying products thereto. The lower part of the chamber is defined by an arcuate screen 12 beneath which is a tapered discharge chamber 13 to receive material passing the screen. A rotor 14 is mounted axially in the casing and pivotally carries a series of cutting or comminuting blades 15 which normally extend radially from the rotor with their tips closely adjacent to the inner wall of the chamber and the screen.

Steam is supplied to the chamber through a conduit 16 which opens into the upper part of the chamber with a curved baffle 17 overlying the opening and extending in the direction of rotation of the rotor therefrom to prevent products in the chamber from being thrown out the conduit. The supply of steam is controlled by a valve 18 to maintain an atmosphere of steam under pressure in the chamber at all times.

The chamber is vented through a vent conduit 19 having an adjustable restriction 21 therein. The conduit 19 opens into the discharge chamber 13 beneath the screen 12 and at a point at which the tips of the blades 15 are moving downward. The portion of the screen 12 overlying the vent conduit opening is made imperforate as shown at 22 to prevent comminuted material from being thrown out the vent conduit. The products to be treated are supplied to the chamber 10 under pressure and in a manner to prevent back flow of steam thereto. As shown the products may be fed through a hopper 23 from which they fall into a conventional feed screw 24 which will advance them into a feed pump 25 connected to the inlet conduit 11. The feed pump 25 is of a construction sold commercially under the name "Moyno" and its construction is more particularly disclosed in Patents Nos. 2,085,115; 2,028,407 and 2,512,764. As diagrammatically illustrated the pump includes a fixed casing 26 having a double helical opening therethrough and a helical rotor 27 of circular cross section which is mounted in the casing for rotation and for lateral shifting movement. We have found that a pump of this type will force the product into the inlet conduit 11 under a positive pressure and without crushing the product.

Comminuted material passing through the screen is discharged from the discharge chamber 13 into a discharge conduit 28 where the material is retained for a predetermined time under pressure and at an elevated temperature. Preferably a discharge pump 29 is provided for receiving the material from the discharge chamber and forcing it into the discharge conduit to insure that pressure will be maintained in the discharge conduit. The material is discharged past a pressure control valve 31 which is preferably of the type more particularly described and claimed in the copending application of Robert F. Krupp, Serial No. 513,360, filed June 6, 1955. As indicated generally this valve has a tapered discharge seat 32 closed by a reduced stem 33 which is carried by a relatively large plunger 34. The plunger is subjected at its upper end to a controlling pressure supplied through conduit 35 and when the pressure of the product exceeds the controlling pressure by a predetermined amount the valve will open allowing the product to be discharged through the seat 32 thereby suddenly relieving the pressure on the product.

After discharge, the products may be subjected to further treatment or in the case of many food products may be taken directly to a packaging machine to be canned or frozen.

In carrying out the method according to the present invention the products to be treated are supplied to the hopper in the form of relatively large particles or chunks and are fed by the feed screw 24 and the pump 25 into the comminuting chamber. The products will be discharged from the inlet conduit 11 to drop through the chamber and through the atmosphere of steam under pressure therein. As the products drop they will be struck by the blades 15 and will be cut or comminuted thereby, being carried around in the chamber until they are reduced to a size to pass at screen 12. Air or other gases contained in the products and some steam from the chamber will be continuously vented through the vent connection 19 so that the chamber will always be filled with live steam under pressure. The discharged products will be forced by the pump 29 through the discharge conduit 28 where they will be held under pressure and at an elevated temperature for a time predetermined by the size of the discharge conduit and the supply rate of the product. The products are eventually discharged past valve 31 where the pressure therein is suddenly released.

To maintain the desired pressure in the comminuting chamber the supply of steam therethrough is controlled in accordance with the pressure in the chamber. For this purpose a pressure responsive instrument or regulator 36 is provided connected through a pipe 37 to the vent conduit and mechanically connected to the valve 18 to regulate it. By adjusting the restriction in the vent conduit and the setting of the instrument 36 any desired steam pressure and steam temperature can be maintained in the comminutor chamber.

Control of the steam supply is preferably further adjusted in accordance with the temperature of the product in the discharge conduit 28. For this purpose a temperature sensing bulb 38 may be maintained in the discharge conduit and connected to a second instrument or regulator 39 which is in turn connected to the valve 18.

Various types of products have been treated according to the method of the present invention as for example different types of vegetables, fruits and meats for the preparation of purees, soups and the like. In treating vegetables such as peas, carrots, beets, tomatoes and the like, the products in raw washed form are fed into the hopper 23 and are forced into the comminution chamber to be comminuted and cooked or partially cooked therein. We have found that extremely accurate control of the process can be obtained by regulating the size of the screen 12, the temperature in the comminutor chamber, and the holding time in the discharge conduit. With peas for example excellent results were achieved with a screen size of .045 inch, a temperature of about 238° F. and holding time on the order of 20 seconds. By varying the temperature and holding time it was found that peas of different degrees of maturity could be satisfactorily processed, the more mature peas in general requiring slightly lower temperature and longer holding times. Enzyme action is increased by treating the products in the temperature range most favorable to the particular enzyme involved and holding them for longer holding times. In processing carrots a screen size of .031 inch, a temperature of about 230° F. and a holding time of about 30 seconds was employed satisfactorily. Beets were satisfactorily processed with a screen size of .031 inch, a temperature of 240° F. and a holding time of 20 seconds. It was found that considerable variation in temperature and holding time was necessary for products such as sweet potatoes, depending largely upon maturity and condition of the product, the lower temperatures on the order of 130° F. to 170° F. and longer holding times being preferable for more mature products to enhance enzyme activity.

In processing fruits such as apricots, peaches, apples and the like, the same general steps were followed, with fruits such as peaches or apricots being pitted and in some cases skinned before processing. Satisfactory results for products of this type were obtained using a screen of .063 inch and a temperature on the order of 250° F.

Meat products, including beef and bacon, for the production of infant foods, soups and the like, were also treated. The meat products were cut or chopped into relatively large chunks or particles which were fed into the apparatus in the same manner as the vegetable products. In some cases the meat was partially precooked and was treated in the apparatus using screen sizes varying from .047 inch to .063 inch and temperatures on the order of 250° F. to 290° F. After treating according to the present method the products were screened by being passed through one or more finishers to remove any hard particles. It was found in the case of meats that the present method produced remarkable results in elimination of waste, the waste being reduced on the order of about 30 times.

The present method is also desirable for the treatment of other types of materials such as for example the extraction of vegetable oils and treatment of various chemical products such as plastics. It is therefore not intended that the scope of the invention should be confined to the specific products discussed in detail above nor otherwise than by the terms of the appended claims.

What is claimed is:

1. The method of treating materials selected from the group consisting of vegetables, fruits and meats which comprises feeding the products to be treated in relatively large particles into a comminutor chamber, supplying steam under pressure to the chamber to provide an atmosphere of steam under pressure in the chamber to effect partial cooking of the products, constantly venting the chamber to remove gas therefrom and to maintain a flow of steam thereto while retaining the products in the chamber, comminuting the products while they are enveloped in said atmosphere of steam under pressure, discharging the comminuted products from the chamber, maintaining the discharged products under pressure and at an elevated temperature for a time sufficient to complete cooking of the products, and suddenly releasing the pressure on the products.

2. The method of treating materials selected from the group consisting of vegetables, fruits and meats which comprises feeding the products to be treated in relatively large particles into a comminutor chamber, supplying steam under pressure to the chamber to provide an atmosphere of steam under pressure in the chamber to effect cooking of the products, constantly venting the chamber to remove gas therefrom and to maintain a flow of steam thereto while retaining the products in the chamber, comminuting the products while they are enveloped in said atmosphere of steam under pressure, discharging the comminuted products from the chamber, and controlling the rate of supply of steam to the chamber in response to the pressure of the vented gas and the temperature of the discharged products to maintain a predetermined pressure of steam in the chamber.

3. The method of treating materials selected from the group consisting of vegetables, fruits and meats which comprises supplying steam under pressure to a comminutor chamber to maintain an atmosphere of steam under pressure therein, constantly venting the chamber to remove gas therefrom and to maintain a flow of steam thereto while retaining the products in the chamber, feeding relatively large particles of products to be treated into the upper part of the chamber to drop loosely into and through the chamber, impinging rapidly moving bodies against the particles to reduce them in size as they pass through the chamber and while they are enveloped in the steam under pressure therein, the steam under pressure in the chamber effecting cooking of the particles as they are reduced by impingement of the rapidly moving bodies thereagainst, and discharging the comminuted particles from the chamber.

4. The method of treating materials selected from the group consisting of vegetables, fruits and meats which comprises supplying steam under pressure to a comminutor chamber to maintain an atmosphere of steam under pressure therein, constantly venting the chamber to remove gas therefrom and to maintain a flow of steam thereto while retaining the products in the chamber, feeding relatively large particles of products to be treated into the upper part of the chamber to drop loosely into and through the chamber, impinging rapidly moving bodies against the particles to reduce them in size as they pass through the chamber and while they are enveloped in the steam under pressure therein, the steam under pressure in the chamber effecting cooking of the particles as they are reduced by impingement of the rapidly moving bodies thereagainst, discharging the comminuted particles from the chamber, maintaining the discharged material under pressure and at an elevated temperature for a time sufficient to complete cooking thereof, and suddenly releasing the pressure on the discharged material.

5. The method of claim 4 including the further step of controlling the rate of supply of steam to the chamber in response to the pressure in the chamber.

References Cited in the file of this patent

UNITED STATES PATENTS

| | | |
|---|---|---|
| 2,086,338 | Sodergreen | July 6, 1937 |
| 2,101,506 | Morrow et al. | Dec. 7, 1937 |
| 2,540,028 | Fitzpatrick | Jan. 30, 1951 |
| 2,681,279 | Sloan et al. | June 15, 1954 |

FOREIGN PATENTS

| | | |
|---|---|---|
| 8,492 | Switzerland | June 9, 1894 |